United States Patent [19]
Bogar et al.

[11] 4,110,000
[45] Aug. 29, 1978

[54] FIBER OPTIC CONNECTOR

[75] Inventors: Jerry Hench Bogar; Tore Rudolf Johnson, both of Harrisburg, Pa.

[73] Assignee: AMP Incorporated, Harrisburg, Pa.

[21] Appl. No.: 662,294

[22] Filed: Mar. 1, 1976

[51] Int. Cl.² .............................................. G02B 5/14
[52] U.S. Cl. .................................................. 350/96.21
[58] Field of Search ........................... 350/96 C, 96 B

[56] References Cited
U.S. PATENT DOCUMENTS

| 3,885,859 | 5/1975 | Dalgleish et al. | 350/96 C |
| 3,910,678 | 10/1975 | McCartney et al. | 350/96 C |
| 3,917,383 | 11/1975 | Cook et al. | 350/96 C |
| 4,030,809 | 6/1977 | Onishi et al. | 350/96 C |

FOREIGN PATENT DOCUMENTS 2,531,857   2/1976   Fed. Rep. of Germany ........ 350/96 C

*Primary Examiner*—John K. Corbin
*Assistant Examiner*—Rolf Hille
*Attorney, Agent, or Firm*—Russell J. Egan

[57] ABSTRACT

A connector assembly is disclosed for detachably connecting fiber optic cables with the fibers making a one-on-one engagement. The subject connector assembly includes means for spreading the fibers from the tightly packed bundle of the cable to a substantially circular array which allows the individual fibers to be mated on a one-to-one basis with like spread fibers of a second cable fixed in a mating connector half. Thus the subject connector obviates the previous problems of potting the fibers in a connector and the inefficiency of utilizing bundles of fibers mated together.

11 Claims, 8 Drawing Figures

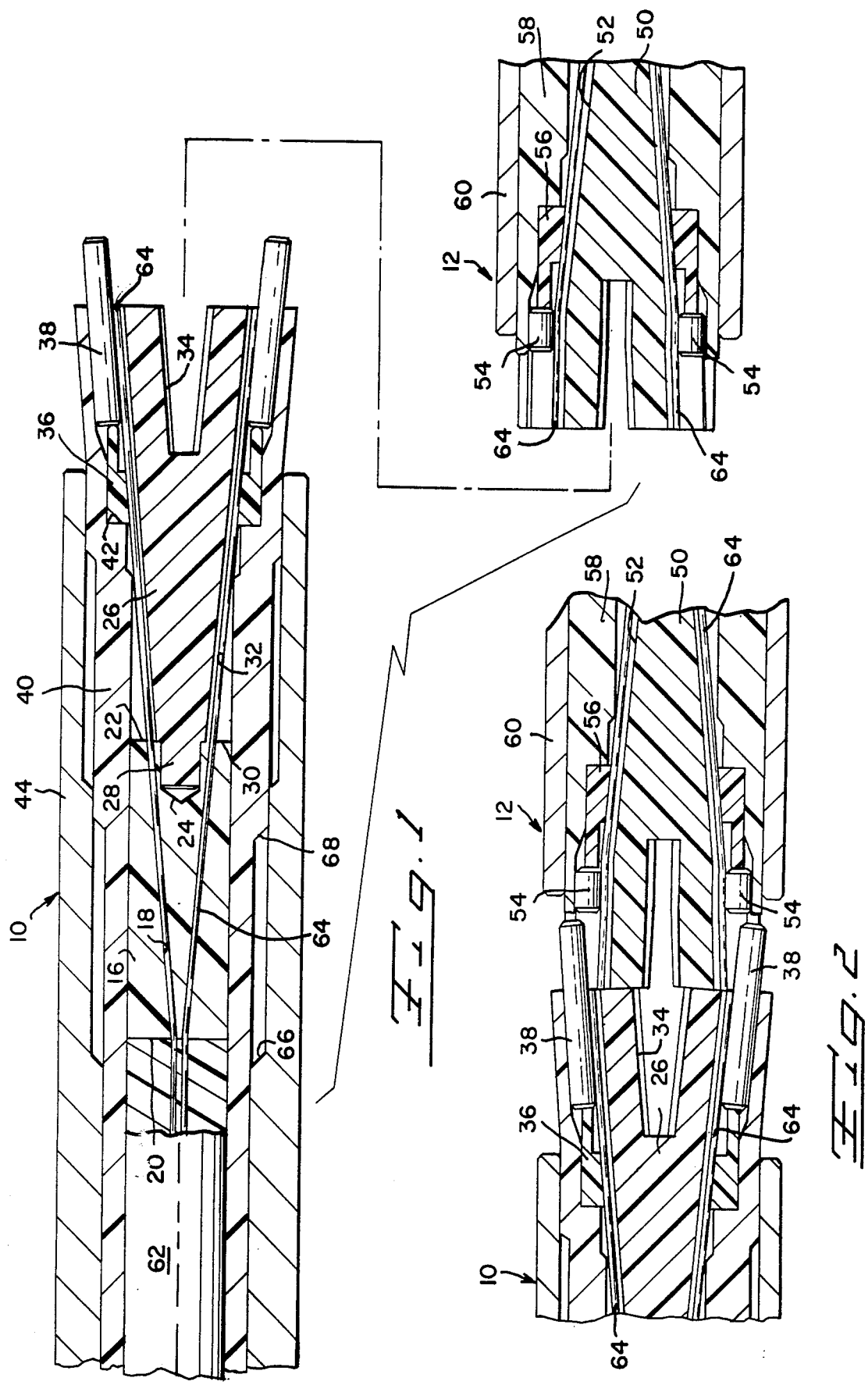

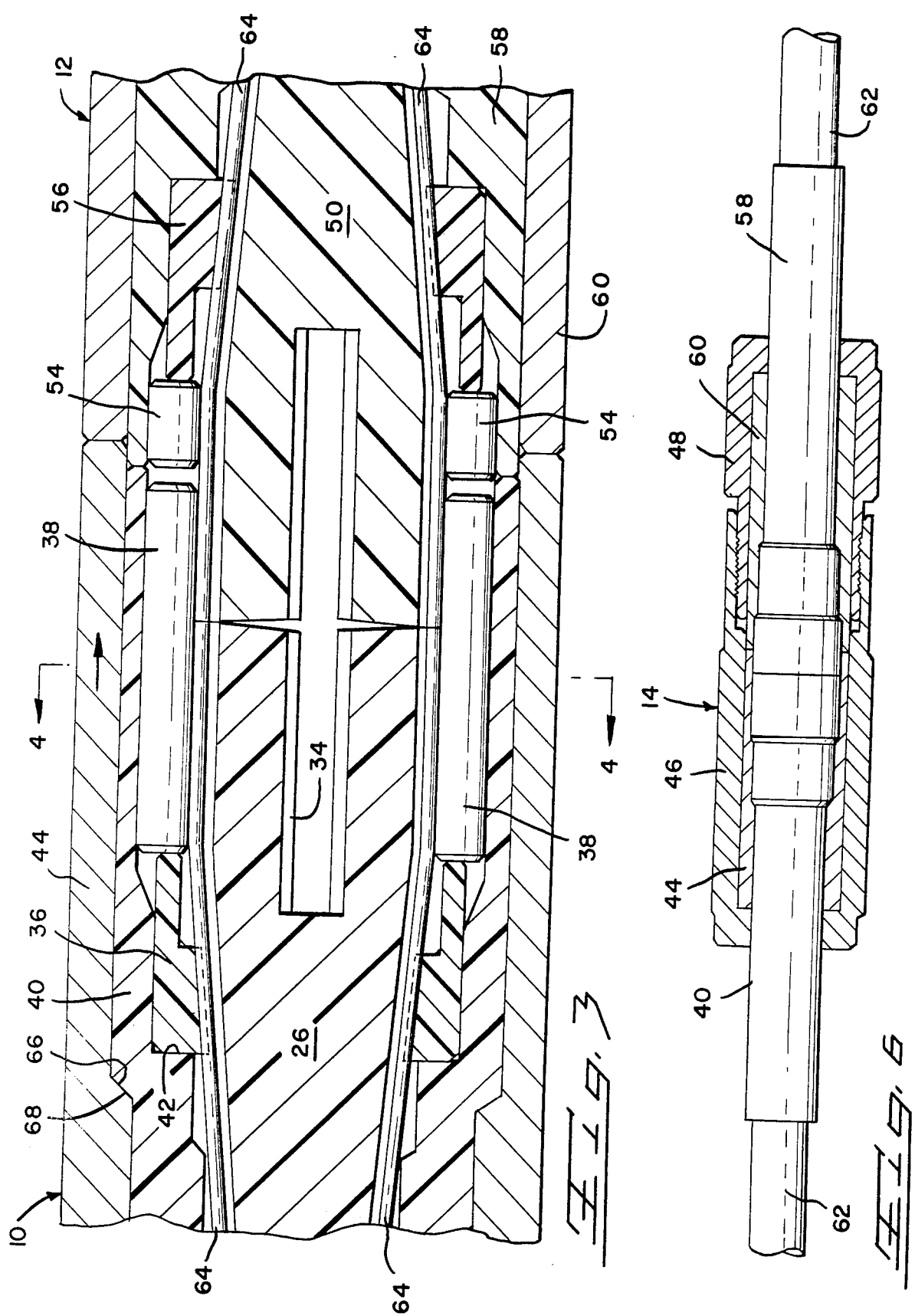

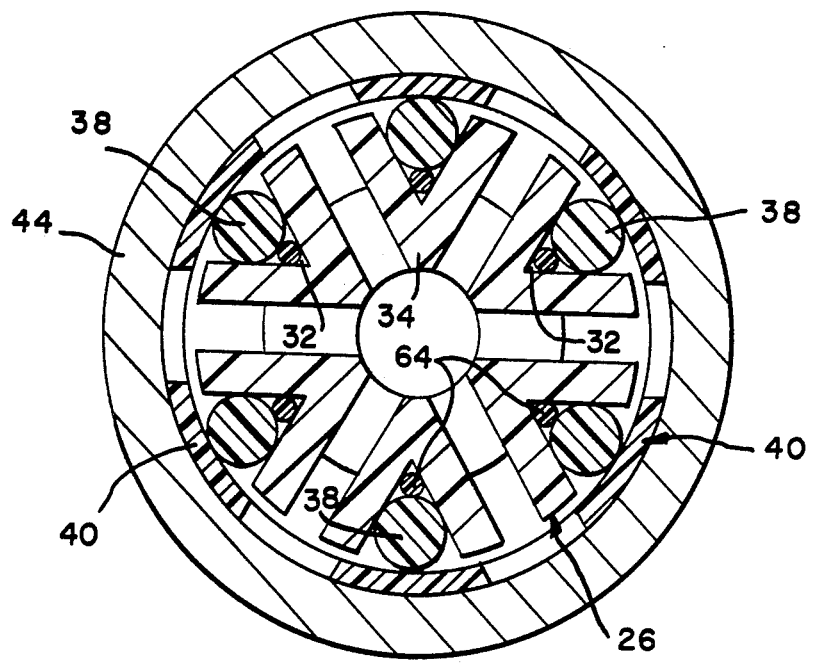
Fig. 4
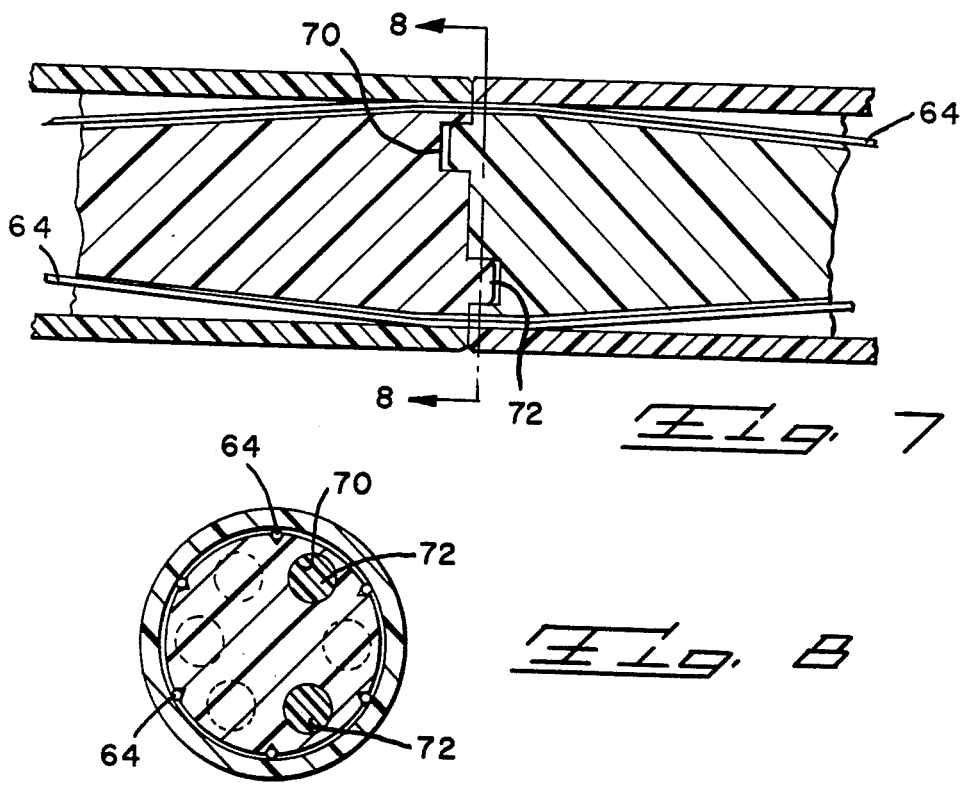
Fig. 7
Fig. 8

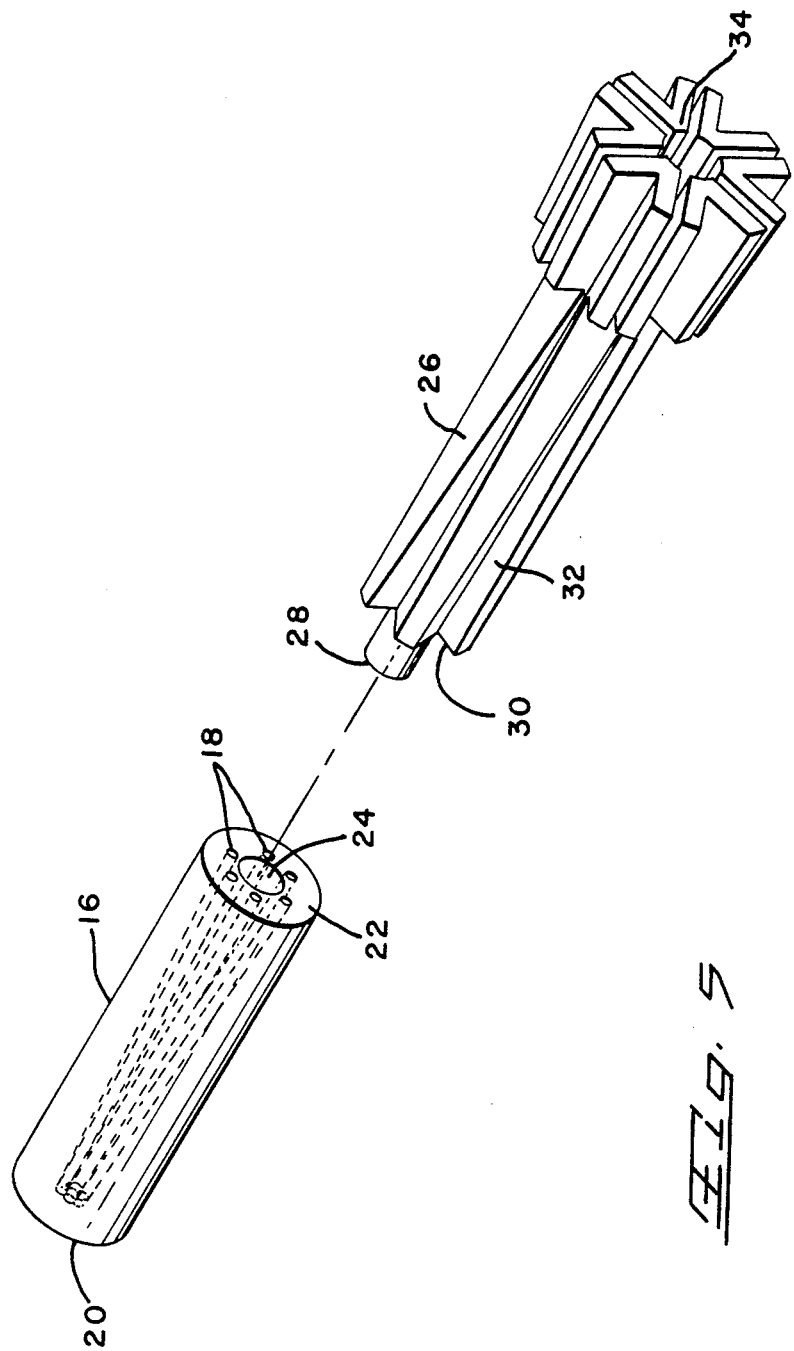

FIBER OPTIC CONNECTOR

BACKGROUND OF THE INVENTION

1. The Field Of The Invention

The present invention relates to an improved connector assembly for detachably connecting fiber optic cables with a one-to-one engagement of fibers and, in particular, to a fiber optic connector assembly which obviates many disadvantages of the prior art.

2. The Prior Art

Since the development of light transmitting fibers there has been a constant attempt to find satisfactory means for terminating cables made up of bundles of optical fibers in such a manner that the cables can be detachably joined in continuous lengths. Most of these attempts have not proved to be too successful because of the very small size of the fibers and the fact that during manufacture they are coated with material intended both to protect the fiber and improve its light transmitting characteristics. In the case of plastic fibers, the coating material cannot be readily removed by heat or chemical processes since those methods generally would tend to destroy the optical qualities of the fiber. This is not the case with glass fibers. However, with either glass or plastic fibers there is a strict prohibition against nicking the fibers during the removal of the coating layers, since any nick of the fibers will substantially reduce the light transmitting characteristics thereof.

The previous attempts to join optical fibers have generally used a connector which joins bundles of fibers, with the concept being that enough fibers of the bundles will overlap with sufficient alignment to allow light to be transmitted between the connected cables. These connectors generally also require potting of the fibers in the connector with polishing of the end of the fiber bundle to assure good mating and light transmission. While these connectors have, to a certain extent, proved satisfactory, they are exceedingly slow to assemble and substantially reduce the information transmitting characteristics of each fiber optic cable by using only a portion of the fibers at any connection.

The previous attempts to connect optical fibers on a one-to-one basis have generally required feeding the individual fibers into opposite ends of a tubular member which is then either heat shrunk or otherwise bonded to the two fibers. This, of course, forms a permanent joining of the fibers with no possibility for future disconnect without damage to one or the other or both of the fibers. It is also a tedious assembly process to insert the fine diameter fibers into the tubular joining member.

SUMMARY OF THE INVENTION

The present invention relates to an improved disconnectable connector assembly for joining optical fibers of a fiber optical cable on a one-to-one basis. The subject connector includes a fiber spreader member having a plurality of through bores or passages starting at an initial axial point on a first end of the member and diverging radially from the axis to form a spread circular configuration at the second end of the member. A clamping assembly adjacent the second end of the spreader member resiliently secures the fibers in the grooves or channels by mechanical means. Keying means, in combination with the clamping assembly, align the mating members of the connector to assure a one-to-one alignment of the fibers.

It is therefore an object of the present invention to produce an improved connector assembly for detachably joining cables of fiber optic bundles with the fibers engaging on a one-to-one basis.

It is yet another object of the present invention to produce an improved connector assembly which allows ready attachment of individual optical fibers of a fiber optics cable by mechanical means and in such a manner that the mating connector halves can be easily disassembled.

It is a further object of the present invention to produce a fiber optic bundle connector assembly which includes means to spread the fibers from a tightly compacted group to a radially spread circular configuration, secure the fibers in the spread configuration, and detachably mate the fibers on a one-to-one basis with like spread fibers fixed in a mating connector half.

It is a further object of the present invention to produce a fiber optic connector assembly which can be readily and economically produced.

The means for accomplishing the foregoing objects and other advantages of the present invention will become apparent to those skilled in the art from the following detailed description taken with reference to the accompanying drawings.

BRIEF DESCRIPTION OF THE DRAWINGS

FIG. 1 is a longitudinal section through the plug portion and part of a detached receptacle portion of a connector assembly according to the present invention;

FIG. 2 is a view similar to FIG. 1 showing the plug and receptacle portions of the subject connector assembly during the mating of the connector;

FIG. 3 is a view similar to FIGS. 1 and 2 showing the subject connector assembly in a fully mated condition;

FIG. 4 is a transverse section taken along lines 4—4 of FIGS. 3;

FIG. 5 is an exploded perspective view of the spreader member and supporting member according to the present invention;

FIG. 6 is a side elevation, partly in section, of a fully mated connector assembly of the present invention;

FIG. 7 is a side elevation, partly in section, of an alternate arrangement for the mating faces of the subject connector assembly; and FIG. 8 is a transverse section taken along line 8—8 of FIG. 7.

DETAILED DESCRIPTION OF THE PREFERRED EMBODIMENT

The plug member 10 and receptacle member 12 of the subject connector assembly 14 are substantially identical and for this reason only the plug portion will be described in detail with reference to FIGS. 1 to 6.

The plug member 10 includes a fiber spreading member 16 having a plurality of through bores 18 extending from a first end face 20, where they are closely aligned in a circular configuration along the axis of the member, to a second face 22 where they are in a spread connector configuration with the bores 18 generally defining a conical configuration within member 16. A keying recess 24 is formed in the face 22. A fiber support member 26 includes a keying projecting 28 extending from the rear face 30 thereof and a plurality of outwardly directed V-shaped grooves or channels 32 extending the length thereof. The forward end of the member 26 is formed as a plurality of cantilever arms 34 with each arm having a groove 32 extending along the back thereof. A collar member 36 of rigid material surrounds the member 26 and serves as an abutment for each of the plurality of cylindrical pins 38 lying in the respective grooves 32. The sidewalls forming the groove are extended in the area of the pins to provide support therefor. However, the dimensions of the pins with respect to the walls is such that the pins will always extend radially outwardly beyond the walls. A spring fingered sleeve member 40 surrounds both the member 26, the collar member 36, and all of the pins 38. The sleeve 40 includes at least one inwardly directed annular step 42 which abuts against collar member 36. An annular sliding camming member 44 surrounds the sleeve member 40. The camming member 44 is made of rigid material. As it is moved forwardly along the axis of the connector, it acts against sleeve member 40 to cam the pins 38 into parallel alignment coaxial with and forming a circle around the axis of the connector member. An outer shell 46 is then slid forward and secured to the like shell 48 of the receptacle member 12, as shown in FIG. 6. These members can be joined by threads, as shown, or by any of the well known fastening members, such as a bayonet connection.

As mentioned previously, the receptacle portion 12 is substantially the same as the plug portion and only the mating end thereof has been shown. The portions shown include the support member 50 having the V-grooves 52 and pins 54, the collar member 56, the sleeve member 58, and the sliding cam member 60.

It will be noted the pins 54, sleeve member 58, and cam member 60 of the receptacle member are much shorter than the respective parts of the plug member. This allows for the pins of the plug member to be received in the ends of the V-shaped channels 52 of the receptacle manner to align and hold down the fibers mounted therein. This can best be seen from FIG. 2, which shows how the pins of the plug member serve to assure proper axial alignment of the fibers in both mating halves.

The cables 62 are prepared by stripping the outer jacketing from one end of the cable to expose the individual fibers 64. The fibers are inserted through the connector member to strike face 20 of the member 16 and are spread as they follow the throughbores 18 to the V-shaped grooves 32. When the fibers reach the mating end of the connector half, pushing is stopped and the fibers are secured therein by moving the camming member forwardly until annular steps 66-68 engage. This makes the connectors ready for joining.

The subject connector can be made of a wide variety of materials. The primary requisites for the materials are that member 26 must have a limited amount of resiliency in the cantilever arm portions 34 and all materials must be of such a nature as to not to destroy the light transmitting characteristics of the individual fibers. Preferably the outer jackets 46 and 48 would be of such material as to assure a positive locking of the connector members. Since these are strictly on the outside of the cables they can easily be of any of the standardly accepted metallic materials.

The present invention also can be readily adapted for use with cables having any number of fibers and fibers of any diameter. It is also within the scope of the invention to have a single fiber extending axially through the connector in combination with any number of fibers spread into one or more concentric rings about the axial fiber.

An alternate embodiment is shown in FIGS. 7 and 8. The connector members are provided with coded recesses 70 and studs 72. The studs are mated into the respective recesses to assure proper alignment of the corresponding fibers.

The present invention may be subject to many changes and modifications without departing from the spirit or essential characteristics thereof. The present embodiment is therefore to be considered in all respects as illustrative and not restrictive of the scope of the invention.

What is claimed is:

1. A fiber optic connector having mating plug and receptacle members for detachably joining fiber optics cables having a plurality of optical fibers, with said fibers mating on a one-to-one basis, each said member comprising:

a spreader member adapted to receive the fibers of the bundle in a closely bunched alignment at a first end of the member and cause them to diverge to a spread configuration at the opposite end of the member with said fibers generally defining a cone;

a fiber support member including a body having a first end matable with the opposite end of said spreader member and a second end defined by a like plurality of resilient cantilever arms with a like plurality of V-shaped channels extending longitudinally along said fiber support member and adapted to receive therein a fiber from said spreader member;

a like plurality of elongated pin members each lying longitudinally in a respective one of said V-shaped channels and adapted to hold said fibers against the bottom thereof; and cam means acting against said pins to bias them against said fibers and into said V-shaped channels.

2. A connector according to claim 1 wherein:

said spreader member comprises a solid body having a plurality of through bores therein, said bores having a closely spaced configuration at said first end of said member and spreading radially as they progress longitudinally through said member to have a spread configuration at the opposite end of said spreader member.

3. A connector according to claim 2 wherein:

said body is cylindrical and said bores are in a substantially circular pattern about the longitudinal axis of said body.

4. A connector according to claim 1 wherein:

said fiber support member further includes a sleeve-like member substantially surrounding said elongated pin members and holding them in their respective V-grooves.

5. A connector according to claim 1 further comprising:

said spreader member comprises a solid body having a plurality of through bores therein, said bores having a closely spread configuration at a first end of said member and spreading radially as they progress longitudinally through said member to have a spread configuration at the opposite end of said member, and keying means on said spreader member and said fiber support member whereby said bores and said V-grooves are aligned.

6. A connector according to claim 1 wherein:

said pin members of said plug are longer than said pin members of said receptacle, said pin members of said plug extending from a free end thereof to lie at least partially in the corresponding V-grooves of fiber support member of the receptacle member in a mated condition.

7. A connector according to claim 1 further comprising:
 keying means on said plug member and said receptacle member to align the respective channels thereof.

8. A connector according to claim 1 further comprising:
 means to detachably secure said plug member and said receptacle member together.

9. A connector according to claim 1 further comprising:
 cable strain relief means on at least one of said plug member and said receptacle member.

10. A connector according to claim 1 wherein said cam means includes:
 an annular member adapted for longitudinal movement along at least said fiber support member whereby said pins are biased into said channels against said fibers.

11. A connector for detachably coupling fiber optics cables having a plurality of optical fibers, with said fibers mating on a one-to-one basis, said connector comprising:
 a plug member and a mating receptacle member, each said member including:
 a spreader member having a like plurality of through bores in a closely bunched arrangement at a first end of said member and a circular spread configuration at the opposite end of said member, said bores receiving said fibers and spreading them to a generally conical configuration;
 a fiber support member having a first end matable with said opposite end of said spreader member and a like plurality of resilient cantilever arms extending from the opposite end said fiber support member from said spreader member, a like plurality of V-shaped grooves in spaced relation about the exterior of said fiber support member aligned with and extending laterally therealong to the end of said arms;
 keying means on said opposite end of said spreader member and said first end of said fiber support member aligning said bores in the former with the V-grooves in the latter;
 a like plurality of elongated pin members each received lying longitudinally in a respective one of said grooves to bias said fibers to the bottoms thereof;
 cam means movable longitudinally along at least said fiber support member and acting against said pin members to assure the location of said fiber in said V-shaped grooves;
 polarizing means on said plug member and said receptacle member assuring alignment of the respective fibers carried thereby;
 means to detachably secure said plug member and said receptacle member together; and
 said pin members in said plug member lying at least partially in the V-grooves of the fiber support member of said receptacle member in a mated condition.

* * * * *